(12) United States Patent
DeSaw et al.

(10) Patent No.: US 7,910,634 B2
(45) Date of Patent: Mar. 22, 2011

(54) AQUEOUS DISPERSIONS OF POLYMER-ENCLOSED PARTICLES, RELATED COATING COMPOSITIONS AND COATED SUBSTRATES

(75) Inventors: Shawn A. DeSaw, McMurray, PA (US); Dennis L. Faler, Glenshaw, PA (US); W. David Polk, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1142 days.

(21) Appl. No.: 11/440,619

(22) Filed: May 25, 2006

(65) Prior Publication Data

US 2006/0252881 A1 Nov. 9, 2006

Related U.S. Application Data

(63) Continuation-in-part of application No. 11/337,062, filed on Jan. 20, 2006, which is a continuation-in-part of application No. 10/876,031, filed on Jun. 24, 2004, and a continuation-in-part of application No. 10/809,764, filed on Mar. 25, 2004, and a continuation-in-part of application No. 10/809,595, filed on Mar. 25, 2004, and a continuation-in-part of application No. 10/809,639, filed on Mar. 25, 2004, now abandoned.

(51) Int. Cl.
C09D 11/00 (2006.01)

(52) U.S. Cl. ........ 523/160; 523/161; 523/200; 523/201; 523/202; 523/203; 523/204; 523/205; 523/206; 523/207; 523/208; 523/209; 523/210; 523/211; 523/212; 523/213; 523/214; 523/215; 523/216; 524/847

(58) Field of Classification Search .................. 523/160, 523/161, 200–216; 524/847
See application file for complete search history.

(56) References Cited

U.S. PATENT DOCUMENTS

| | | | | |
|---|---|---|---|---|
| 3,389,061 A | 6/1968 | Bono | ............................. | 204/32 |
| 4,499,143 A | 2/1985 | Panush | ......................... | 428/336 |
| 5,106,533 A | 4/1992 | Hendrickson et al. | ........ | 252/314 |
| 5,110,881 A | 5/1992 | McBain et al. | ............... | 525/455 |
| 5,201,948 A | 4/1993 | Fasano et al. | ................. | 106/311 |
| 5,334,297 A | 8/1994 | Nakada et al. | ............. | 204/181.2 |
| 5,340,789 A | 8/1994 | Evans et al. | .................... | 503/227 |
| 5,538,548 A | 7/1996 | Yamazaki | ................... | 106/20 C |
| 5,538,549 A | 7/1996 | Kato et al. | ..................... | 106/20 C |
| 5,716,435 A | 2/1998 | Aida et al. | ................. | 106/31.85 |
| 5,837,041 A | 11/1998 | Bean et al. | .................... | 106/31.6 |
| 5,902,711 A | 5/1999 | Smith et al. | ................... | 430/137 |
| 5,942,027 A | 8/1999 | Ikai et al. | ................... | 106/31.33 |
| 5,990,219 A | 11/1999 | Sakai et al. | ................... | 524/441 |
| 6,022,911 A * | 2/2000 | Hashizume et al. | .......... | 523/213 |
| 6,030,440 A | 2/2000 | Sekioka et al. | ............ | 106/31.65 |
| 6,031,024 A | 2/2000 | Uraki et al. | .................... | 523/161 |
| 6,099,627 A | 8/2000 | Saibara et al. | ............. | 106/31.33 |
| 6,153,001 A | 11/2000 | Suzuki et al. | ............. | 106/31.65 |
| 6,387,997 B1 | 5/2002 | Grolemund et al. | .......... | 524/506 |
| 6,410,619 B2 | 6/2002 | Greene et al. | .................. | 524/88 |
| 6,416,818 B1 | 7/2002 | Aikens et al. | ................ | 427/383.1 |
| 6,417,249 B1 | 7/2002 | Nguyen et al. | ................ | 523/201 |
| 6,624,276 B2 | 9/2003 | Lamers et al. | .................. | 528/45 |
| 2002/0149002 A1 | 10/2002 | Womelsdorf et al. | ...... | 252/363.5 |
| 2002/0193514 A1 | 12/2002 | Wang et al. | ................... | 524/853 |
| 2003/0125417 A1 | 7/2003 | Vanier et al. | .................. | 523/171 |
| 2004/0156994 A1 | 8/2004 | Wiese et al. | ................ | 427/372.2 |
| 2005/0159523 A1 | 7/2005 | Bremser et al. | ............... | 524/431 |
| 2005/0182169 A1 | 8/2005 | Stubbe et al. | ................. | 524/379 |
| 2005/0212159 A1 | 9/2005 | Richards et al. | ............ | 264/40.7 |
| 2005/0212171 A1 | 9/2005 | Ferencz et al. | ........... | 264/211.21 |
| 2005/0213423 A1 | 9/2005 | Ferencz et al. | ............... | 366/76.2 |
| 2005/0287348 A1 | 12/2005 | Faler et al. | ................. | 428/315.5 |

FOREIGN PATENT DOCUMENTS

| | | |
|---|---|---|
| EP | 0 773 268 A2 | 5/1997 |
| EP | 1006161 A1 | 6/2000 |
| EP | 1371694 A2 | 12/2003 |
| WO | WO 02/14391 A2 | 2/2002 |
| WO | WO 03/095532 A1 | 11/2003 |
| WO | WO 03/095571 A1 | 11/2003 |
| WO | WO 2004/000916 A2 | 12/2003 |
| WO | WO 2005/000914 A1 | 1/2005 |

OTHER PUBLICATIONS

Pending U.S. Appl. No. 10/876,031, filed Jun. 24, 2004.*

* cited by examiner

*Primary Examiner* — Edward J Cain
(74) *Attorney, Agent, or Firm* — Donald R. Palladino

(57) ABSTRACT

Disclosed are aqueous dispersions of polymer-enclosed particles, such as nanoparticles. Also disclosed are methods for making an aqueous dispersion of polymer-enclosed particles, polymerizable polymers useful in such a method, powder coating compositions formed from such an aqueous dispersion, substrates at least partially coated with such a composition, and reflective surfaces comprising a non-hiding coating layer deposited from such a composition.

20 Claims, No Drawings

AQUEOUS DISPERSIONS OF POLYMER-ENCLOSED PARTICLES, RELATED COATING COMPOSITIONS AND COATED SUBSTRATES

CROSS-REFERENCE TO RELATED APPLICATIONS

This application is a continuation-in-part of U.S. patent application Ser. No. 11/337,062, filed Jan. 20, 2006, which is entitled "Aqueous Dispersions of Polymer-Enclosed Particles, Related Coating Compositions and Coated Substrates", which is a continuation-in-part of: (i) U.S. patent application Ser. No. 10/876,031 filed Jun. 24, 2004, entitled, "Aqueous Dispersions of Microparticles Having a Nanoparticulate Phase and Coating Compositions Containing The Same"; (ii) U.S. patent application Ser. No. 10/809,764, which was filed on Mar. 25, 2004, and is entitled, "Process For Manufacturing Powder Coating Compositions Introducing Hard to Incorporate Additives and/or Providing Dynamic Color Control; (iii) U.S. patent application Ser. No. 10/809,595, which was filed on Mar. 25, 2004, and is entitled, "Focused Heat Extrusion Process For Manufacturing Powder Coating Compositions"; and (iv) U.S. patent application Ser. No. 10/809,639, which was filed on Mar. 25, 2004 now abandoned, and is entitled, "Apparatus For Manufacturing Thermosetting Powder Coating Compositions With Dynamic Control Including Low Pressure Injection Systems", each of which being incorporated by reference herein.

FIELD OF THE INVENTION

The present invention relates to, among other things, aqueous dispersions of polymer-enclosed particles, such as nanoparticles, methods for making such an aqueous dispersion, polymerizable polymers useful in such a method, powder coating compositions formed from such an aqueous dispersion, and substrates at least partially coated with such a composition.

BACKGROUND INFORMATION

Coating compositions, such as powder coating compositions, often include colorant and/or filler particles to impart color and/or performance properties in the resulting coating. Pigment particles tend to have a strong affinity for each other and, unless separated, tend to clump together to form agglomerates. Therefore, these agglomerates are often dispersed in a resinous grind vehicle and, optionally, dispersants by milling or grinding using high shear techniques to break up the agglomerates. If nano-sized pigment particles are desired, further milling is often required to obtain the desired particle size.

Pigments and fillers usually consist of solid crystalline particles ranging in diameter from about 0.02 to 2 microns (i.e., 20 to 2000 nanometers). Agglomeration is a serious problem for nano-sized particle pigments and filler materials (such as carbon black) in particular because these nanoparticles have a relatively large surface area. Thus, acceptable dispersion of such nanoparticles often requires an inordinate amount of resinous grind vehicle and/or dispersant to effect de-agglomeration and to prevent subsequent re-agglomeration of the nanoparticles.

The presence of such high levels of resinous grind vehicles and dispersants, however, in the final coating composition can be detrimental to the resultant coating. For example, high levels of dispersants have been known to contribute to water sensitivity of the resultant coating. Also, some resinous grind vehicles, for example, acrylic grind vehicles, can negatively impact coating performance properties such as chip resistance and flexibility.

Powder coatings compositions for use in coating various types of substrates are often desired. Such coating compositions can greatly reduce, or even eliminate, the use of organic solvents that are often used in liquid coating compositions. When a powder coating composition is cured by heating, little if any volatile material is given off to the surrounding environment. This is a significant advantage over liquid coating compositions in which organic solvent is volatized into the surrounding atmosphere when the coating composition is cured by heating.

It would also be desirable to provide an aqueous dispersion of resin-enclosed particles, wherein re-agglomeration of the particles is minimized, and which may be suitable for use in preparing powder coating compositions.

SUMMARY OF THE INVENTION

In certain respects, the present invention is directed to aqueous dispersions comprising polymer-enclosed particles, wherein the polymer-enclosed particles comprise particles enclosed by a friable polymer. The present invention is also directed to powder coating compositions comprising such polymer-enclosed particles, substrates at least partially coated with such powder coating compositions, and substrates at least partially coated with a multi-layer composite coating wherein at least one coating layer is deposited from such a powder coating composition.

In other respects, the present invention is directed to methods for making an aqueous dispersion of polymer-enclosed particles. The methods comprise (1) providing a mixture, in an aqueous medium, of (a) particles, (b) a polymerizable ethylenically unsaturated monomer, and (c) a water-dispersible polymerizable dispersant, and (2) polymerizing the ethylenically unsaturated monomer and polymerizable dispersant to form polymer-enclosed particles comprising a water-dispersible polymer.

In other respects, the present invention is directed to methods for making polymer-enclosed particles. The methods comprise (1) providing a mixture, in an aqueous medium, of (a) particles, (b) a polymerizable ethylenically unsaturated monomer, and (c) a water-dispersible polymerizable dispersant; (2) polymerizing the ethylenically unsaturated monomer and polymerizable dispersant to form an aqueous dispersion comprising polymer-enclosed particles comprising a water-dispersible, friable polymer; (3) removing water from the aqueous dispersion to form a solid material comprising the polymer-enclosed particles, and (4) fragmenting the solid material.

In other respects, the present invention is directed to methods for making powder coating compositions comprising (1) introducing to an extruder (a) an aqueous dispersion of polymer-enclosed particles, and (b) dry materials; (2) blending (a) and (b) in the extruder; (3) devolatilizing the blend to form an extrudate; (3) cooling the extrudate, and (4) milling the extrudate to a desired particle size.

In still other respects, the present invention is directed to methods for increasing the chromaticity of a powder coating composition. These methods comprise including in the powder coating composition a plurality of polymer-enclosed nanoparticles having a maximum haze of 10%.

In yet other respects, the present invention is directed to methods for matching the color of a preselected protective and decorative coating deposited from a liquid coating composition. These methods comprise: (a) determining the visible color of the preselected coating by measuring the absorbance or reflectance of the preselected coating; and (b) making a powder coating composition comprising a plurality of polymer-enclosed nanoparticles having a maximum haze of 10%, wherein a coating deposited from the powder coating composition matches the visible color of the preselected coating.

The present invention is also directed to water-dispersible, polymerizable polyester polyurethanes comprising terminal ethylenically unsaturated groups. The polyurethanes are prepared from reactants comprising (a) a polyisocyanate, (b) a polyester polyol, (c) a polyamine, (d) a material having an ethylenically unsaturated group and an active hydrogen group, and (e) a material having an acid functional group or anhydride and an active hydrogen group.

In addition, the present invention is directed to reflective surfaces at least partially coated with a transparent tinted coating exhibiting a plurality of hues, wherein the transparent tinted coating is deposited from a coating composition comprising polymer-enclosed color-imparting particles, wherein the coating has a plurality of thicknesses.

Also, the present invention is directed to reflective surfaces at least partially coated with a multi-layer composite coating. These multi-layer composite coatings comprise: (a) a first transparent tinted coating exhibiting a first color; and (b) a second transparent tinted coating deposited over at least a portion of the first transparent tinted coating and exhibiting a second color different from the first color. Moreover, the first transparent tinted coating and the second transparent tinted coating are deposited from a coating composition comprising polymer-enclosed color-imparting particles, and at least one of the transparent tinted coatings have a plurality of thicknesses.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to aqueous dispersions of polymer-enclosed particles. As used herein, the term "dispersion" refers to a two-phase system in which one phase includes finely divided particles distributed throughout a second phase, which is a continuous phase. The dispersions of the present invention often are oil-in-water emulsions, wherein an aqueous medium provides the continuous phase of the dispersion in which the polymer-enclosed particles are suspended as the organic phase.

As used herein, the term "aqueous", "aqueous phase", "aqueous medium," and the like, refers to a medium that either consists exclusively of water or comprises predominantly water in combination with another material, such as, for example, an inert organic solvent. In certain embodiments, the amount of organic solvent present in the aqueous dispersions of the present invention is less than 20 weight percent, such as less than 10 weight percent, or, in some cases, less than 5 weight percent, or, in yet other cases, less than 2 weight percent, with the weight percents being based on the total weight of the dispersion. Non-limiting examples of suitable organic solvents are propylene glycol monobutyl ether, ethylene glycol monohexyl ether, ethylene glycol monobutyl ether, n-butanol, benzyl alcohol, and mineral spirits.

As used herein, the term "polymer-enclosed particles" refers to particles that are at least partially enclosed by, i.e., confined within, a polymer to an extent sufficient to physically separate particles from each other within the aqueous dispersion, thereby preventing significant agglomeration of the particles. It will be appreciated, of course, that the dispersions of the present invention may also include particles that are not polymer-enclosed particles.

In certain embodiments, the particles that are enclosed by a polymer in the aqueous dispersions of the present invention comprise nanoparticles. As used herein, the term "nanoparticles" refers to particles that have an average particle size of less than 1 micron. In certain embodiments, the nanoparticles used in the present invention have an average particles size of 300 nanometers or less, such as 200 nanometers or less, or, in some cases, 100 nanometers or less. Therefore, in certain embodiments, the aqueous dispersions of the present invention comprise nanoparticles that are polymer-enclosed and, therefore, are not significantly agglomerated.

For purposes of the present invention, average particle size can be measured according to known laser scattering techniques. For example, average particle size can be determined using a Horiba Model LA 900 laser diffraction particle size instrument, which uses a helium-neon laser with a wave length of 633 nm to measure the size of the particles and assumes the particle has a spherical shape, i.e., the "particle size" refers to the smallest sphere that will completely enclose the particle. Average particle size can also be determined by visually examining an electron micrograph of a transmission electron microscopy ("TEM") image of a representative sample of the particles, measuring the diameter of the particles in the image, and calculating the average primary particle size of the measured particles based on magnification of the TEM image. One of ordinary skill in the art will understand how to prepare such a TEM image and determine the primary particle size based on the magnification. The primary particle size of a particle refers to the smallest diameter sphere that will completely enclose the particle. As used herein, the term "primary particle size" refers to the size of an individual particle.

The shape (or morphology) of the particles can vary. For example, generally spherical morphologies (such as solid beads, microbeads, or hollow spheres), can be used, as well as particles that are cubic, platy, or acicular (elongated or fibrous). Additionally, the particles can have an internal structure that is hollow, porous or void free, or a combination of any of the foregoing, e.g., a hollow center with porous or solid walls. For more information on suitable particle characteristics see H. Katz et al. (Ed.), Handbook of Fillers and Plastics (1987) at pages 9-10.

Depending on the desired properties and characteristics of the resultant dispersion and/or coating compositions of the present invention (e.g., coating hardness, scratch resistance, stability, or color), mixtures of one or more particles having different average particle sizes can be employed.

The particles, such as nanoparticles, present in the aqueous dispersions of the present invention can be formed from polymeric and/or non-polymeric inorganic materials, polymeric and/or non-polymeric organic materials, composite materials, as well as mixtures of any of the foregoing. As used herein, "formed from" denotes open, e.g., "comprising," claim language. As such, it is intended that a composition or substance "formed from" a list of recited components be a composition comprising at least these recited components, and can further comprise other, non-recited components, during the composition's formation. Additionally, as used herein, the term "polymer" is meant to encompass oligomers, and includes without limitation both homopolymers and copolymers.

As used herein, the term "polymeric inorganic material" means a polymeric material having a backbone repeat unit based on an element or elements other than carbon. Moreover, as used herein, the term "polymeric organic materials" means synthetic polymeric materials, semi-synthetic polymeric materials and natural polymeric materials, all of which have a backbone repeat unit based on carbon.

The term "organic material," as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate.

As used herein, the term "inorganic material" means any material that is not an organic material.

As used herein, the term "composite material" means a combination of two or more differing materials. The particles formed from composite materials generally have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

For example, a particle can be formed from a primary material that is coated, clad or encapsulated with one or more secondary materials to form a composite particle that has a softer surface. In certain embodiments, particles formed from composite materials can be formed from a primary material that is coated, clad or encapsulated with a different form of the primary material. For more information on particles useful in the present invention, see G. Wypych, Handbook of Fillers, 2nd Ed. (1999) at pages 15-202.

As aforementioned, the particles useful in the present invention can include any inorganic materials known in the art. Suitable particles can be formed from ceramic materials, metallic materials, and mixtures of any of the foregoing. Non-limiting examples of such ceramic materials can comprise metal oxides, mixed metal oxides, metal nitrides, metal carbides, metal sulfides, metal silicates, metal borides, metal carbonates, and mixtures of any of the foregoing. A specific, non-limiting example of a metal nitride is boron nitride; a specific, non-limiting example of a metal oxide is zinc oxide; non-limiting examples of suitable mixed metal oxides are aluminum silicates and magnesium silicates; non-limiting examples of suitable metal sulfides are molybdenum disulfide, tantalum disulfide, tungsten disulfide, and zinc sulfide; non-limiting examples of metal silicates are aluminum silicates and magnesium silicates, such as vermiculite.

In certain embodiments of the present invention, the particles comprise inorganic materials selected from aluminum, barium, bismuth, boron, cadmium, calcium, cerium, cobalt, copper, iron, lanthanum, magnesium, manganese, molybdenum, nitrogen, oxygen, phosphorus, selenium, silicon, silver, sulfur, tin, titanium, tungsten, vanadium, yttrium, zinc, and zirconium, including oxides thereof, nitrides thereof, phosphides thereof, phosphates thereof, selenides thereof, sulfides thereof, sulfates thereof, and mixtures thereof. Suitable non-limiting examples of the foregoing inorganic particles include alumina, silica, titania, ceria, zirconia, bismuth oxide, magnesium oxide, iron oxide, aluminum silicate, boron carbide, nitrogen doped titania, and cadmium selenide.

The particles can comprise, for example, a core of essentially a single inorganic oxide, such as silica in colloidal, fumed, or amorphous form, alumina or colloidal alumina, titanium dioxide, iron oxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type.

Non-polymeric, inorganic materials useful in forming the particles used in the present invention can comprise inorganic materials selected from graphite, metals, oxides, carbides, nitrides, borides, sulfides, silicates, carbonates, sulfates, and hydroxides. A non-limiting example of a useful inorganic oxide is zinc oxide. Non-limiting examples of suitable inorganic sulfides include molybdenum disulfide, tantalum disulfide, tungsten disulfide, and zinc sulfide. Non-limiting examples of useful inorganic silicates include aluminum silicates and magnesium silicates, such as vermiculite. Non-limiting examples of suitable metals include molybdenum, platinum, palladium, nickel, aluminum, copper, gold, iron, silver, alloys, and mixtures of any of the foregoing.

In certain embodiments, the particles can be selected from fumed silica, amorphous silica, colloidal silica, alumina, colloidal alumina, titanium dioxide, iron oxide, cesium oxide, yttrium oxide, colloidal yttria, zirconia, colloidal zirconia, and mixtures of any of the foregoing. In certain embodiments, the particles comprise colloidal silica. As disclosed above, these materials can be surface treated or untreated. Other useful particles include surface-modified silicas, such as are described in U.S. Pat. No. 5,853,809 at column 6, line 51 to column 8, line 43, incorporated herein by reference.

As another alternative, a particle can be formed from a primary material that is coated, clad or encapsulated with one or more secondary materials to form a composite material that has a harder surface. Alternatively, a particle can be formed from a primary material that is coated, clad or encapsulated with a differing form of the primary material to form a composite material that has a harder surface.

In one example, and without limiting the present invention, an inorganic particle formed from an inorganic material, such as silicon carbide or aluminum nitride, can be provided with a silica, carbonate or nanoclay coating to form a useful composite particle. In another non-limiting example, a silane coupling agent with alkyl side chains can interact with the surface of an inorganic particle formed from an inorganic oxide to provide a useful composite particle having a "softer" surface. Other examples include cladding, encapsulating or coating particles formed from non-polymeric or polymeric materials with differing non-polymeric or polymeric materials. A specific non-limiting example of such composite particles is DUALITE™, which is a synthetic polymeric particle coated with calcium carbonate that is commercially available from Pierce and Stevens Corporation of Buffalo, N.Y.

In certain embodiments, the particles used in the present invention have a lamellar structure. Particles having a lamellar structure are composed of sheets or plates of atoms in hexagonal array, with strong bonding within the sheet and weak van der Waals bonding between sheets, providing low shear strength between sheets. A non-limiting example of a lamellar structure is a hexagonal crystal structure. Inorganic solid particles having a lamellar fullerene (i.e., buckyball) structure are also useful in the present invention.

Non-limiting examples of suitable materials having a lamellar structure include boron nitride, graphite, metal dichalcogenides, mica, talc, gypsum, kaolinite, calcite, cadmium iodide, silver sulfide and mixtures thereof. Suitable metal dichalcogenides include molybdenum disulfide, molybdenum diselenide, tantalum disulfide, tantalum diselenide, tungsten disulfide, tungsten diselenide and mixtures thereof.

The particles can be formed from non-polymeric, organic materials. Non-limiting examples of non-polymeric, organic materials useful in the present invention include, but are not limited to, stearates (such as zinc stearate and aluminum stearate), diamond, carbon black and stearamide.

The particles used in the present invention can be formed from inorganic polymeric materials. Non-limiting examples of useful inorganic polymeric materials include polyphosphazenes, polysilanes, polysiloxanes, polygermanes, polymeric sulfur, polymeric selenium, silicones and mixtures of any of the foregoing. A specific, non-limiting example of a particle formed from an inorganic polymeric material suitable for use in the present invention is Tospearl, which is a particle formed from cross-linked siloxanes and is commercially available from Toshiba Silicones Company, Ltd. of Japan.

The particles can be formed from synthetic, organic polymeric materials. Non-limiting examples of suitable organic polymeric materials include, but are not limited to, thermoset materials and thermoplastic materials. Non-limiting examples of suitable thermoplastic materials include thermoplastic polyesters, such as polyethylene terephthalate, polybutylene terephthalate and polyethylene naphthalate, polycarbonates, polyolefins, such as polyethylene, polypropylene and polyisobutene, acrylic polymers, such as copolymers of styrene and an acrylic acid monomer and polymers containing methacrylate, polyamides, thermoplastic polyurethanes, vinyl polymers, and mixtures of any of the foregoing.

Non-limiting examples of suitable thermoset materials include thermoset polyesters, vinyl esters, epoxy materials, phenolics, aminoplasts, thermoset polyurethanes and mixtures of any of the foregoing. A specific, non-limiting example of a synthetic polymeric particle formed from an epoxy material is an epoxy microgel particle.

The particles can also be hollow particles formed from materials selected from polymeric and non-polymeric inorganic materials, polymeric and non-polymeric organic materials, composite materials and mixtures of any of the foregoing. Non-limiting examples of suitable materials from which the hollow particles can be formed are described above.

In certain embodiments, the particles used in the present invention comprise an organic pigment, for example, azo compounds (monoazo, di-azo, β-Naphthol, Naphthol AS salt type azo pigment lakes, benzimidazolone, di-azo condensation, isoindolinone, isoindoline), and polycyclic (phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone) pigments, and mixtures of any of the foregoing. In certain embodiments, the organic material is selected from perylenes, quinacridones, phthalocyanines, isoindolines, dioxazines (that is, triphenedioxazines), 1,4-diketopyrrolopyrroles, anthrapyrimidines, anthanthrones, flavanthrones, indanthrones, perinones, pyranthrones, thioindigos, 4,4'-diamino-1,1'-dianthraquinonyl, as well as substituted derivatives thereof, and mixtures thereof.

Perylene pigments used in the practice of the present invention may be unsubstituted or substituted. Substituted perylenes may be substituted at imide nitrogen atoms for example, and substituents may include an alkyl group of 1 to 10 carbon atoms, an alkoxy group of 1 to 10 carbon atoms and a halogen (such as chlorine) or combinations thereof. Substituted perylenes may contain more than one of any one substituent. The diimides and dianhydrides of perylene-3,4,9,10-tetracarboxylic acid are preferred. Crude perylenes can be prepared by methods known in the art.

Phthalocyanine pigments, especially metal phthalocyanines may be used. Although copper phthalocyanines are more readily available, other metal-containing phthalocyanine pigments, such as those based on zinc, cobalt, iron, nickel, and other such metals, may also be used. Metal-free phthalocyanines are also suitable. Phthalocyanine pigments may be unsubstituted or partially substituted, for example, with one or more alkyl (having 1 to 10 carbon atoms), alkoxy (having 1 to 10 carbon atoms), halogens such as chlorine, or other substituents typical of phthalocyanine pigments. Phthalocyanines may be prepared by any of several methods known in the art. They are typically prepared by a reaction of phthalic anhydride, phthalonitrile, or derivatives thereof, with a metal donor, a nitrogen donor (such as urea or the phthalonitrile itself), and an optional catalyst, preferably in an organic solvent.

Quinacridone pigments, as used herein, include unsubstituted or substituted quinacridones (for example, with one or more alkyl, alkoxy, halogens such as chlorine, or other substituents typical of quinacridone pigments), and are suitable for the practice of the present invention. The quinacridone pigments may be prepared by any of several methods known in the art but are preferably prepared by thermally ring-closing various 2,5-dianilinoterephthalic acid precursors in the presence of polyphosphoric acid.

Isoindoline pigments, which can optionally be substituted symmetrically or unsymmetrically, are also suitable for the practice of the present invention can be prepared by methods known in the art. A suitable isoindoline pigment, Pigment Yellow 139, is a symmetrical adduct of iminoisoindoline and barbituric acid precursors. Dioxazine pigments (that is, triphenedioxazines) are also suitable organic pigments and can be prepared by methods known in the art.

Mixtures of any of the previously described inorganic particles and/or organic particles can also be used.

The particles useful in the aqueous dispersions of the present invention can comprise color-imparting particles. By the term "color-imparting particles" is meant a particle that significantly absorbs some wavelengths of visible light, that is, wavelengths ranging from 400 to 700 nm, more than it absorbs other wavelengths in the visible region.

If desired, the particles described above can be formed into nanoparticles. In certain embodiments, the nanoparticles are formed in situ during formation of the aqueous dispersion of polymer-enclosed particles, as described in more detail below. In other embodiments, however, the nanoparticles are formed prior to their incorporation into the aqueous dispersion. In these embodiments, the nanoparticles can be formed by any of a number of various methods known in the art. For example, the nanoparticles can be prepared by pulverizing and classifying the dry particulate material. For example, bulk pigments such as any of the inorganic or organic pigments discussed above, can be milled with milling media having a particle size of less than 0.5 millimeters (mm), or less than 0.3 mm, or less than 0.1 mm. The pigment particles typically are milled to nanoparticle sizes in a high energy mill in one or more solvents (either water, organic solvent, or a mixture of the two), optionally in the presence of a polymeric grind vehicle. If necessary, a dispersant can be included, for example, (if in organic solvent) SOLSPERSE® 32000 or 32500 available from Lubrizol Corporation, or (if in water) SOLSPERSE® 27000, also available from Lubrizol Corporation. Other suitable methods for producing the nanoparticles include crystallization, precipitation, gas phase condensation, and chemical attrition (i.e., partial dissolution).

In certain embodiments, the polymer-enclosed color-imparting particles used in the present invention comprise, for example, a polymer selected from acrylic polymers, polyurethane polymers, polyester polymers, polyether polymers, silicon-based polymers, co-polymers thereof, and mixtures thereof. Such polymers can be produced by any suitable method known to those skilled in the art to which the present invention pertains. Suitable polymer include those disclosed in U.S. patent application Ser. No. 10/876,031 at [0061] to [0076], the cited portion of which being incorporated by reference herein, and United States Patent Application Publication No. 2005/0287348 A1 at [0042] to [0044], the cited portion of which being incorporation by reference herein.

As indicated, in other embodiments, however, the aqueous dispersions of the present invention comprise particles enclosed by a friable polymer. As used herein, the term "friable polymer" refers to a polymer that is easily pulverized at ambient conditions. That is, upon removal of liquid materials from the dispersion, the resulting solid material is easily broken into small fragments or pieces, such as would be suitable as a dry feed material to an extruder to produce a powder coating composition. A film-forming polymer, on the other hand, would, upon removal of liquid materials from the dispersion, form a self-supporting continuous film on at least a horizontal surface of a substrate. As used herein, the term "ambient conditions" refers to refers to surrounding conditions, which is often around one atmosphere of pressure, 50% relative humidity, and 25° C.

In certain embodiments of the present invention, the friable polymer comprises the reaction product of (i) a polymerizable polyester polyurethane, and (ii) an ethylenically unsaturated monomer. As used herein, the term "polymerizable polyester polyurethane" refers to a polymer that includes a plurality of ester units,

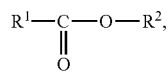

and a plurality of urethane units,

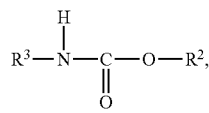

has functional groups that are capable of being polymerized to form a larger polymer, and wherein $R^1$ is an alkyl, cycloalkyl or oxyalkyl moiety, $R^2$ is an alkyl or cycloalkyl moiety, and $R^3$ is alkyl, cycloalkyl, arakyl, or aromatic moiety. In certain embodiments, the polymerizable polyester polyurethane comprises a polyester polyurethane having terminal ethylenic unsaturation. As used herein, the phrase "terminal ethylenic unsaturation" means that at least some of the terminal ends of the polyester polyurethane contain a functional group containing ethylenic unsaturation. Such polyester polyurethanes may also include, but need not necessarily include, internal ethylenic unsaturation. As a result, in certain embodiments, the aqueous dispersions of the present invention comprise a polymerizable polyester polyurethane having terminal ethylenic unsaturation which is prepared from reactants comprising (a) a polyisocyanate, (b) a polyester polyol, and (c) a material comprising an ethylenically unsaturated group and an active hydrogen group. In certain embodiments, the polymerizable polyester polyurethane utilized in the aqueous dispersions of the present invention is formed from reactants further comprising (d) a polyamine, and/or (e) a material comprising an acid functional group or anhydride and a functional group reactive with isocyanate or hydroxyl groups. As used herein, the term "active-hydrogen group" refers to functional groups that are reactive with isocyanates as determined by the Zerewitnoff test as described in the JOURNAL OF THE AMERICAN CHEMICAL SOCIETY, Vol. 49, page 3181 (1927).

Polyisocyanates suitable for use in preparing the polymerizable polyester polyurethane include aliphatical, cycloaliphatical, araliphatical, and/or aromatic isocyanates, and mixtures thereof.

Examples of useful aliphatic and cycloaliphatic polyisocyanates include 4,4-methylenebisdicyclohexyl diisocyanate (hydrogenated MDI), hexamethylene diisocyanate (HDI), isophorone diisocyanate (IPDI), methylenebis(cyclohexyl isocyanate), trimethyl hexamethylene diisocyanate (TMDI), meta-tetramethylxylylene diisocyanate (TMXDI), and cyclohexylene diisocyanate (hydrogenated XDI). Other aliphatic polyisocyanates include isocyanurates of IPDI and HDI.

Examples of suitable aromatic polyisocyanates include tolylene diisocyanate (TDI) (i.e., 2,4-tolylene diisocyanate, 2,6-tolylene diisocyanate or a mixture thereof), diphenylmethane-4,4-diisocyanate (MDI), naphthalene-1,5-diisocyanate (NDI), 3,3-dimethyl-4,4-biphenylene diisocyanate (TODI), crude TDI (i.e., a mixture of TDI and an oligomer thereof), polymethylenepolyphenyl polyisocyanate, crude MDI (i.e., a mixture of MDI and an oligomer thereof), xylylene diisocyanate (XDI) and phenylene diisocyanate.

Polyisocyanate derivatives prepared from hexamethylene diisocyanate, 1-isocyanato-3,3,5-trimethyl-5-isocyanatomethylcyclohexane ("IPDI"), including isocyanurates thereof, and/or 4,4'-bis(isocyanatocyclohexyl)methane are suitable.

In certain embodiments, the amount of polyisocyanate used to prepare the polymerizable polyester polyurethane ranges from 20 to 70 percent by weight, such as 30 to 60 percent by weight or, in some cases, 40 to 50 percent by weight, with the weight percents being based on the total weight of resin solids used to prepare the polymerizable polyester polyurethane.

Polyester polyols suitable for use in preparing the polymerizable polyester polyurethane may be prepared by any suitable methods, e.g., using saturated dicarboxylic acids or anhydrides thereof (or combination of acids and anhydrides) and polyhydric alcohols, or by ring opening of caprolactones, e.g., epsilon caprolactone. Such polyester polyols are commercially available in various molecular weights. Aliphatic dicarboxylic acids suitable for preparing polyesters include those containing from 4 to 14, such as 6 to 10, carbon atoms inclusive. Examples of such dicarboxylic acids include: succinic acid, glutaric acid, adipic acid, pimelic acid, suberic acid, azelaic aid and sebacic acid. Corresponding anhydrides can also be used. Typically, adipic and azelaic acids are used.

Polyhydric alcohols used in the preparation of polyester polyols suitable for use in preparing the polymerizable polyester polyurethane utilized in certain embodiments of the present invention include, without limitation, aliphatic alcohols containing at least 2 hydroxy groups, e.g., straight chain glycols containing from 2 to 15, such as 4 to 8, carbon atoms inclusive. In certain embodiments, the glycols contain hydroxyl groups in the terminal positions. Non-limiting examples of such polyhydric alcohols include ethylene glycol, diethylene glycol, triethylene glycol, tetraethylene glycol, 1,3-propane diol, 1,3-butane diol, 1,4-butane diol, 1,5-pentane diol, 2,2-dimethylpropane diol, 1,5-hexane diol, 1,7-heptane diol, 1,8-octane diol, 1,10-decane diol and mixtures of such polyhydric alcohols.

In certain embodiments, the polyester polyol is prepared by reacting a dicarboxylic acid (or anhydride thereof) with a polyhydric alcohol in the presence of an esterification catalyst, such as an organo tin catalyst. The amount of acid and alcohol used will vary and depend on the molecular weight polyester desired. Hydroxy terminated polyesters are obtained by utilizing an excess of the alcohol, thereby to obtain linear chains containing a preponderance of terminal hydroxyl groups. Examples of polyesters include: poly(1,4-butylene adipate), poly(1,4-butylene succinate), poly(1,4-butylene glutarate), poly(1,4-butylene pimelate), poly(1,4-butylene suberate), poly(1,4-butylene azelate), poly(1,4butylene sebacate) and poly(epsilon caprolactone). In certain embodiments, the polyester polyol utilized in preparing the friable, polymerizable polyester polyurethane utilized in the aqueous dispersions of the present invention have a weight average molecular weight from 500 to 3000, such as 500 to 2500, or, in some cases, 900 to about 1300.

In certain embodiments, the amount of polyester polyol used to prepare the polymerizable polyester polyurethane included in certain embodiments of the present invention ranges from 10 to 60 percent by weight, such as 20 to 50 percent by weight or, in some cases, 30 to 40 percent by weight, with the weight percents being based on the total weight of resin solids used to prepare the polymerizable polyester polyurethane.

As indicated, the polymerizable polyester polyurethane present in certain embodiments of the aqueous dispersions of the present invention is formed from a material comprising an ethylenically unsaturated group and an active hydrogen group. Suitable ethylenically unsaturated groups include, for example, acrylates, methacrylates, allyl carbamates, and allyl carbonates. The acrylate and methacrylate functional groups may be represented by the formula, $CH_2=C(R_1)-C(O)O-$, wherein $R_1$ is hydrogen or methyl. The allyl carbamates and carbonates may be represented by the formulae, $CH_2=CH-CH_2-NH-C(O)O-$, and $CH_2=CH-CH_2-O-(O)O-$, respectively.

In certain embodiments, the material comprising an ethylenically unsaturated group and an active hydrogen group utilized in preparing the polymerizable polyester polyurethane comprises a hydroxyalkyl(meth)acrylate. Suitable hydroxyalkyl (meth)acrylates include those having from 1 to 18 carbon atoms in the alkyl radical, the alkyl radical being substituted or unsubstituted. Specific non-limiting examples of such materials include 2-hydroxyethyl(meth)acrylate, 2-hydroxypropyl(meth)acrylate, 2-hydroxybutyl(meth)acrylate, hexane-1,6-diol mono(meth)acrylate, 4-hydroxybutyl (meth)acrylate, as well as mixtures thereof. As used herein, the term "(meth)acrylate" is meant to include both acrylates and methacrylates.

In certain embodiments, the amount of the material comprising an ethylenically unsaturated group and an active hydrogen group used to prepare the polymerizable polyester polyurethane ranges from 1 to 12 percent by weight, such as 2 to 8 percent by weight or, in some cases, 4 to 6 percent by weight, with the weight percents being based on the total weight of resin solids used to prepare the polymerizable polyester polyurethane.

As previously indicated, in certain embodiments, the polymerizable polyester polyurethane present in certain embodiments of the aqueous dispersions of the present invention is formed from a polyamine. Useful polyamines include, but are not limited to, primary or secondary diamines or polyamines in which the groups attached to the nitrogen atoms can be saturated or unsaturated, aliphatic, alicyclic, aromatic, aromatic-substituted-aliphatic, aliphatic-substituted-aromatic and heterocyclic. Exemplary suitable aliphatic and alicyclic diamines include 1,2-ethylene diamine, 1,2-porphylene diamine, 1,8-octane diamine, isophorone diamine, propane-2,2-cyclohexyl amine, and the like. Exemplary suitable aromatic diamines include phenylene diamines and the toluene diamines, for example, o-phenylene diamine and p-tolylene diamine. These and other suitable polyamines are described in detail in U.S. Pat. No. 4,046,729 at column 6, line 61 to column 7, line 26, the cited portion of which being incorporated herein by reference.

In certain embodiments, the amount of polyamine used to prepare the polymerizable polyester polyurethane ranges from 0.5 to 5 percent by weight, such as 1 to 4 percent by weight or, in some cases, 2 to 3 percent by weight, with the weight percents being based on the total weight of resin solids used to prepare the polymerizable polyester polyurethane.

As previously indicated, in certain embodiments, the polymerizable polyester polyurethane present in certain embodiments of the aqueous dispersions of the present invention is formed from a material comprising an acid functional group or anhydride and a functional group reactive with the isocyanate or hydroxyl groups of other components from which the polyurethane material is formed. Useful acid functional materials include compounds having the structure:

wherein X is OH, SH, $NH_2$, or NHR, and R includes alkyl, aryl, cycloalkyl, substituted alkyl, substituted aryl, and substituted cycloalkyl groups, and mixtures thereof; Y includes alkyl, aryl, cycloalkyl, substituted alkyl, substituted aryl, and substituted cycloalkyl groups, and mixtures thereof; and Z includes $OSO_3H$, $COOH$, $OPO_3H_2$, $SO_2OH$, $POOH$, and $PO_3H_2$, and mixtures thereof.

Examples of suitable acid functional materials include hydroxypivalic acid, 3-hydroxy butyric acid, D,L-tropic acid, D,L hydroxy malonic acid, D,L-malic acid, citric acid, thioglycolic acid, glycolic acid, amino acid, 12-hydroxy stearic acid, dimethylol propionic acid, mercapto propionic acid, mercapto butyric acid, mercapto-succinic acid, and mixtures thereof.

Useful anhydrides include aliphatic, cycloaliphatic, olefinic, cycloolefinic and aromatic anhydrides. Substituted aliphatic and aromatic anhydrides also are useful provided the substituents do not adversely affect the reactivity of the anhydride or the properties of the resultant polyurethane. Examples of substituents include chloro, alkyl and alkoxy. Examples of anhydrides include succinic anhydride, methylsuccinic anhydride, dodecenyl succinic anhydride, octadecenylsuccinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride, tetrachlorophthalic anhydride, endomethylene tetrahydrophthalic anhydride, trimellitic anhydride, chlorendic anhydride, itaconic anhydride, citraconic anhydride, maleic anhydride, and mixtures thereof.

In certain embodiments, the acid functional material or anhydride provides the polymerizable polyester polyurethane with anionic ionizable groups which can be ionized for solubilizing the polymer in water. As a result, in certain embodiments, the polymerizable polyester polyurethane present in certain embodiments of the aqueous dispersions of the present invention is water-dispersible. As used herein, the term "water-dispersible" means that a material may be dispersed in water without the aid or use of a surfactant. As used herein, the term "ionizable" means a group capable of becoming ionic, i.e., capable of dissociating into ions or becoming electrically charged. An acid may be neutralized with base to from a carboxylate salt group. Examples of anionic groups include $-OSO_3^-$, $-COO^-$, $-OPO_3^-$, $-SO_2O$, $-POO^-$; and $PO_3^=$.

In certain embodiments, the amount of the material comprising an acid functional group or anhydride and a functional group reactive with isocyanate or hydroxyl groups used to prepare the polymerizable polyester polyurethane ranges from 5 to 20 percent by weight, such as 7 to 15 percent by weight or, in some cases, 8 to 12 percent by weight, with the weight percents being based on the total weight of resin solids used to prepare the polymerizable polyester polyurethane.

As indicated, in certain embodiments, the acid groups are neutralized with a base. Neutralization can range from about 0.6 to about 1.1, such as 0.4 to 0.9 or, in some cases, 0.8 to 1.0, of the total theoretical neutralization equivalent. Suitable neutralizing agents include inorganic and organic bases such as sodium hydroxide, potassium hydroxide, ammonia, amines, alcohol amines having at least one primary, secondary, or tertiary amino group and at least one hydroxyl group. Suitable amines include alkanolamines such as monoethanolamine, diethanolamine, dimethylaminoethanol, diisopropanolamine, and the like.

The polymerizable polyester polyurethane utilized in certain embodiments of the aqueous dispersions of the present invention may be formed by combining the above-identified components in any suitable arrangement. For example, the polymerizable polyester polyurethane may be prepared by solution polymerization techniques understood by those skilled in the art to which the present invention pertains.

As should be apparent from the foregoing description, the polymerizable polyester polyurethane present in certain embodiments of the present invention can be nonionic, anionic or cationic. In certain embodiments, the polymerizable polyester polyurethane will have a weight average molecular weight of less than 150,000 grams per mole, such as from 10,000 to 100,000 grams per mole, or, in some cases, from 40,000 to 80,000 grams per mole. The molecular weight of the polyurethane and other polymeric materials used in the practice of the invention is determined by gel permeation chromatography using a polystyrene standard.

As should be apparent from the foregoing description, the present invention is also directed to water-dispersible, polymerizable polyester polyurethanes comprising terminal ethylenically unsaturated groups and formed from components comprising (a) a polyisocyanate, (b) a polyester polyol, (c) a polyamine, (d) a material having an ethylenically unsaturated group and an active hydrogen group, and (e) a material having an acid functional group or anhydride and an active hydrogen group. In certain embodiments, the present invention is directed to water-dispersible, polymerizable polyester polyurethanes comprising terminal ethylenically unsaturated groups formed from components comprising (a) a polyisocyanate present in an amount ranging from 20 to 70 weight percent, (b) a polyester polyol present in an amount ranging from 10 to 60 weight percent, (c) a polyamine present in an amount ranging from 0.5 to 5 weight percent, (d) a material having an ethylenically unsaturated group and an active hydrogen group present in an amount ranging from 1 to 12 weight percent, and (e) a material having an acid functional group or anhydride and an active hydrogen group present in an amount ranging from 5 to 20 weight percent.

As previously indicated, in certain embodiments of the aqueous dispersions of the present invention, a friable polymer is present that comprises the reaction product of (i) a polymerizable polyester polyurethane, such as that previously described, and (ii) an ethylenically unsaturated monomer. Suitable ethylenically unsaturated monomers include any of the polymerizable ethylenically, unsaturated monomers, including vinyl monomers known in the art. Non-limiting examples of useful ethylenically unsaturated carboxylic acid functional group-containing monomers include (meth) acrylic acid, beta-carboxyethyl acrylate, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof. As used herein, "(meth)acrylic" and terms derived therefrom are intended to include both acrylic and methacrylic.

Non-limiting examples of other useful ethylenically unsaturated monomers free of carboxylic acid functional groups include alkyl esters of (meth)acrylic acids, for example, ethyl (meth)acrylate, methyl(meth)acrylate, butyl(meth)acrylate, 2-ethylhexyl(meth)acrylate, 2-hydroxyethyl(meth)acrylate, hydroxypropyl (meth)acrylate, hydroxy butyl(meth)acrylate, isobornyl(meth)acrylate, lauryl (meth)acrylate, and ethylene glycol di(meth)acrylate; vinyl aromatics such as styrene and vinyl toluene; (meth)acrylamides such as N-butoxymethyl acrylamide; acrylonitriles; dialkyl esters of maleic and fumaric acids; vinyl and vinylidene halides; vinyl acetate; vinyl ethers; allyl ethers; allyl alcohols; derivatives thereof and mixtures thereof.

The ethylenically unsaturated monomers also can include ethylenically unsaturated, beta-hydroxy ester functional monomers, such as those derived from the reaction of an ethylenically unsaturated acid functional monomer, such as a monocarboxylic acid, for example, acrylic acid, and an epoxy compound which does not participate. in the free radical initiated polymerization with the unsaturated acid monomer. Examples of such epoxy compounds are glycidyl ethers and esters. Suitable glycidyl ethers include glycidyl ethers of alcohols and phenols such as butyl glycidyl ether, octyl glycidyl ether, phenyl glycidyl ether and the like.

In certain embodiments, the polymerizable polyester polyurethane and the ethylenically unsaturated monomer are present in the aqueous dispersions of the present invention in a weight ratio of 95:5 to 30:70, such as 90:10 to 40:60, or, in some cases, from 80:20 to 60:40.

The aqueous dispersions comprising polymer-enclosed particles of the present invention, whether they include a friable polymer or not, can be prepared by any of a variety of methods. For example, in certain embodiments, the aqueous dispersions of the present invention are prepared by a method comprising (A) providing a mixture, in an aqueous medium, of (i) particles, (ii) one or more polymerizable, ethylenically unsaturated monomers; and/or (iii) a mixture of one or more polymerizable unsaturated monomers with one or more polymers; and/or (iv) one or more polymers, and then subjecting the mixture to high stress shear conditions in the presence of an aqueous medium.

Such methods are described in detail in U.S. patent application Ser. No. 10/876,031 at [0054] to [0090], incorporated by reference herein, and United States Published Patent Application 2005/0287348 at [0036] to [0050], the cited portion of which being incorporated herein by reference.

In other embodiments, however, the aqueous dispersions of the present invention are made by a method comprising (1) providing a mixture, in an aqueous medium, of (i) particles, (ii) a polymerizable ethylenically unsaturated monomer, and (iii) a water-dispersible polymerizable dispersant, and (2) polymerizing the ethylenically unsaturated monomer and polymerizable dispersant to form polymer-enclosed particles comprising a water-dispersible polymer. In these embodiments, the polymerizable dispersant may comprise any polymerizable material that is water-dispersible and which, upon polymerization with the ethylenically unsaturated monomer, produces polymer-enclosed particles comprising a water-dispersible polymer, in some cases, a water-dispersible, friable polymer. In certain embodiments, the polymerizable dispersant comprises the previously described water-dispersible, polymerizable polyester polyurethane having terminal ethylenic unsaturation.

In these embodiments, the water-dispersible polymerizable dispersant is capable is dispersing itself and other materials, including the ethylenically unsaturated monomers, in the aqueous medium without the need for surfactants and/or high shear conditions. As a result, the foregoing method for making an aqueous dispersion of polymer-enclosed particles is particularly suitable in situations where use of the high stress shear conditions described U.S. patent application Ser. No. 10/876,031 at [0081] to [0084] and United States Published Patent Application No. 2005/0287348 at [0046], is not desired or feasible. Therefore, in certain embodiments, the aqueous dispersions of the present invention are prepared by a method that does not include the step of subjecting the mixture of particles, polymerizable ethylenically unsaturated monomer, and water-dispersible polymerizable dispersant to high stress shear conditions.

In addition, the foregoing method of the present invention enables the formation of nanoparticles in situ, rather than requiring the formation of nanoparticles prior preparation of the aqueous dispersion. In these methods, particles having an average particle size of 1 micron or more, after being mixed with the ethylenically unsaturated monomer and the water-dispersible polymerizable dispersant in the aqueous medium, may be formed into nanoparticles (i.e., the nanoparticles are formed in situ). In certain embodiments, the nanoparticles are formed by subjecting the aqueous medium to pulverizing conditions. For example, the particles can be milled with milling media having a particle size of less than 0.5 millimeters, or less than 0.3 millimeters, or, in some cases, less than 0.1 millimeters. In these embodiments, the particles can be milled to nanoparticle size in a high energy mill in the presence of the aqueous medium, the polymerizable ethylenically unsaturated monomer, and the water-dispersible polymerizable dispersant. If desired, another dispersant can be used, such as SOLSPERSE 27000, available from Avecia, Inc.

As indicated, the foregoing methods for making aqueous dispersions of the present invention include the step of free-radically polymerizing the ethylenically unsaturated monomer and polymerizable dispersant to form polymer-enclosed particles comprising a water-dispersible polymer. In certain embodiments, at least a portion of the polymerization occurs during formation of nanoparticles, if applicable. Also, a free radical initiator may be used. Both water and oil soluble initiators can be used.

Non-limiting examples suitable water-soluble initiators include ammonium peroxydisulfate, potassium peroxydisulfate and hydrogen peroxide. Non-limiting examples of oil soluble initiators include t-butyl hydroperoxide, dilauryl peroxide and 2,2'-azobis(isobutyronitrile). In many cases, the reaction is carried out at a temperature ranging from 20° to 80° C. The polymerization can be carried out in either a batch or a continuous process. The length of time necessary to carry out the polymerization can range from, for example, 10 minutes to 6 hours, provided that the time is sufficient to form a polymer in situ from the one or more ethylenically unsaturated monomers.

Once the polymerization process is complete, the resultant product is a stable dispersion of polymer-enclosed particles in an aqueous medium which can contain some organic solvent. Some or all of the organic solvent can be removed via reduced pressure distillation at a temperature, for example, of less than 40° C. As used herein, the term "stable dispersion" or "stably dispersed" means that the polymer-enclosed particles neither settle nor coagulate nor flocculate from the aqueous medium upon standing.

In certain embodiments, the polymer-enclosed particles are present in the aqueous dispersions of the present invention in an amount of at least 10 weight percent, or in an amount of 10 to 80 weight percent, or in an amount of 25 to 50 weight percent, or in an amount of 25 to 40 weight percent, with weight percents being based on weight of total solids present in the dispersion.

In certain embodiments, the dispersed polymer-enclosed particles have a maximum haze of 10%, or, in some cases, a maximum haze of 5%, or, in yet other cases, a maximum haze of 1%, or, in other embodiments, a maximum haze of 0.5%. As used herein, "haze" is determined by ASTM D1003.

The haze values for the polymer-enclosed particles described herein are determined by first having the particles, such as nanoparticles, dispersed in a liquid (such as water, organic solvent, and/or a dispersant, as described herein) and then measuring these dispersions diluted in a solvent, for example, butyl acetate, using a Byk-Gardner TCS (The Color Sphere) instrument having a 500 micron cell path length. Because the % haze of a liquid sample is concentration dependent, the % haze as used herein is reported at a transmittance of about 15% to about 20% at the wavelength of maximum absorbance. An acceptable haze may be achieved for relatively large particles when the difference in refractive index between the particles and the surrounding medium is low. Conversely, for smaller particles, greater refractive index differences between the particle and the surrounding medium may provide an acceptable haze.

In the foregoing methods of the present invention, upon reaction of the ethylenically unsaturated monomer with the polymerizable dispersant, polymer-enclosed particles are formed, which, as previously indicated, the inventors believe results in a phase barrier that physically prevents the particles, particularly nanoparticles, from re-agglomerating within the aqueous dispersion. As a result, the foregoing methods of the present invention result in an aqueous dispersion of particles, such as nanoparticles, wherein reagglomeration of the nanoparticles is minimized or avoided altogether.

In certain embodiments, the present invention is directed to methods for making polymer-enclosed particles. These methods comprise the methods for making an aqueous dispersion of polymer-enclosed particles, as previously described, wherein the polymer-enclosed particles comprise a friable polymer and further comprising (1) removing water from the aqueous dispersion to form a solid material comprising the polymer-enclosed particles, and (2) fragmenting the solid material. In these embodiments, the water can be removed from the aqueous dispersion by any suitable drying method, such as through the use of a drum dryer, a roller dryer, a spray dryer, or the like. Moreover, the solid material can be fragmented by any suitable technique, such as through the use of a hammer mill or the like. Following fragmentation, the resultant granules may be further processed, such as by being screened in a classifier, before packaging.

The present invention is also directed to powder coating compositions formed from an aqueous dispersion of polymer-enclosed particles. As used herein, the term "powder coating composition" refers to compositions suitable for producing a coating, which are embodied in solid particulate form, rather than liquid form. In certain embodiments of the powder coating compositions of the present invention, the polymer-enclosed particles comprise nanoparticles.

In addition to the polymer-enclosed particles, the powder coating compositions of the present invention may comprise a particulate film-forming resin. Suitable film-forming resins include, for example, an epoxy resin, such as an epoxy group-containing acrylic polymer or a polyglycidyl ether of a polyhydric alcohol and a suitable curing agent for the epoxy resin, such as a polyfunctional carboxylic acid group-containing material or a dicyanamide. Examples of curable particulate resinous materials are described in Reissue U.S. Pat. No. RE 32,261 and U.S. Pat. No. 4,804,581, incorporated by reference herein. Examples of other suitable particulate film-forming resins are carboxylic acid functional resins, such as carboxylic acid functional polyesters and acrylic polymers and suitable curing agents for such materials, such as triglycidyl isocyanurate and beta-hydroxyalkylamide curing agents as described, for example, in U.S. Pat. No. 4,801,680 and U.S. Pat. No. 4,988,767, incorporated by reference herein.

In certain embodiments, the powder coating compositions of the present invention contain from 50 to 90 percent by weight, such as 60 to 80 percent by weight, of the particulate film-forming resin, based on the total weight of the powder coating composition. In certain embodiments, the powder coating compositions of the present invention contain from 0.1 to 50 percent by weight, such as 1 to 20 percent by weight, of polymer-enclosed particles, based on the total weight of the powder coating composition.

The powder coating compositions of the present invention can optionally include other materials such as other pigments, fillers, light stabilizers, flow modifiers, anti-popping agents, and anti-oxidants. Suitable pigments include, for example, titanium dioxide, ultramarine blue, phthalocyanine blue, phthalocyanine green, carbon black, graphite fibrils, black iron oxide, chromium green oxide, ferride yellow and quindo red.

Anti-popping agents can be added to the composition to allow any volatile material to escape from the film during baking. Benzoin is a commonly preferred anti-popping agent and when used is generally present in amounts of from 0.5 to 3.0 percent by weight based on total weight of the powder coating composition.

In certain embodiments, the powder coating compositions of the present invention include fumed silica or the like to reduce caking of the powder during storage. An example of a fumed silica is sold by Cabot Corporation under the trademark CAB-O-SIL. The fumed silica is present in amounts ranging from 0.1 to 1 percent by weight based on total weight of the powder coating formulation.

The present invention is also directed to methods for making powder coating compositions. In certain embodiments, wherein the polymer-enclosed particles comprise a friable polymer, the polymer-enclosed particles and other coating components are all embodied in a dried, particulate form, blended together, and then melt blended in an extruder. In other embodiments, however, such as those cases wherein an aqueous dispersion of polymer-enclosed particles is used that does not include a friable polymer, the powder coating compositions of the present invention are made by a method comprising (1) introducing to an extruder powder coating composition components comprising: (a) an aqueous dispersion of polymer-enclosed particles, and (b) dry materials; (2) blending (a) and (b) in the extruder; (3) devolatilizing the blend to form an extrudate; (4) cooling the extrudate, and (5) milling the extrudate to a desired particle size. As used herein, the term "devolatize" means to remove volatile materials, including water and organic solvents. In certain embodiments, such powder coating compositions are made by a method and/or apparatus described in United States Patent Application Publication Nos. 2005/0212159A1; 2005/0213423A1; and/or 2005/0212171A1, the relevant disclosures of which being incorporated herein by reference.

In yet other embodiments, such powder coating compositions are made by a method that comprises (a) introducing an aqueous dispersion of polymer-enclosed particles to a mixture comprising dry materials and water, and (b) removing the water from the resulting mixture. In these embodiments, the water can be removed by any suitable drying method, such as through the use of a drum dryer, a roller dryer, a spray dryer, or the like. Moreover, the solid material can be further processed, such as by fragmenting by any suitable technique, such as through the use of a hammer mill or the like. The solid material may also be processed through an extruder and/or screened in a classifier, before packaging.

In these methods of the present invention, the dry materials may include the particulate film-forming resin described earlier as well as any other composition additives. The dry materials may be first blending in a high shear mixer such as a planetary mixture. In certain embodiments, the dry materials and the aqueous dispersion of the present invention are then blended in an extruder at a temperature ranging from 80° C. to 150° C. The extrudate is then cooled and pulverized into a particulate blend.

The powder coating compositions of the invention can be applied to a variety of substrates including metallic substrates, for example, aluminum and steel substrates. The powder coating compositions are often applied by spraying, and in the case of a metal substrate, by electrostatic spraying, or by the use of a fluidized bed. The powder coating compositions of the present invention can be applied in a single sweep or in several passes to provide a film having a thickness after cure of from about 1 to 10 mils (25 to 250 micrometers), usually about 2 to 4 mils (50 to 100 micrometers). In many cases, after application of the powder coating composition, the coated substrate is heated to a temperature sufficient to cure the coating, often to a temperature ranging from 250° F. to 500° F. (121.1° C. to 260.0° C.) for 1 to 60 minutes, such as 300° F. to 400° F. (148.9° C. to 204.4° C.) for 15 to 30 minutes.

As a result, the present invention is also directed to substrates, such as metal substrates, at least partially coated by a coating deposited from a powder coating composition of the present invention.

The powder coating compositions of the present invention may be used to form a single coating, for example, a monocoat, a clear top coating or a base coat in a two-layered system or both; or as one or more layers of a multi-layered system including a clear top coating composition, a colorant layer and/or a base coating composition, and/or a primer layer, including, for example, an electrodeposition primer and/or a primer-surfacer layer.

The present invention is also directed to substrates at least partially coated with a multi-layer composite coating wherein at least one coating layer is deposited from such a composition. In certain embodiments, for example, the powder coating composition of the present invention comprises the basecoat layer in a multi-layer composite coating comprising a basecoat and a topcoat. As a result, in these embodiments, after application and curing of the powder coating composition of the present invention, at least one topcoat layer can be applied to the basecoat layer. The topcoat can, for example, be deposited from a powder coating composition, an organic solvent-based coating composition or a water-based coating composition, as is well known in the art. The film-forming composition of the topcoat can be any of the compositions useful in coatings applications, including, for example, a film-forming composition that comprises a resinous binder selected from acrylic polymers, polyesters, including alkyds, and polyurethanes. The topcoat composition can be applied by any conventional coating technique such as brushing, spraying, dipping or flowing, but they are most often applied by spraying. The usual spray techniques and equipment for air spraying, airless spray and electrostatic spraying in either manual or automatic methods can be used.

In certain embodiments, the present invention is directed to reflective surfaces at least partially coated with a color-imparting non-hiding coating layer deposited from a powder coating composition comprising a plurality of polymer-enclosed nanoparticles having a maximum haze of 10%. In certain embodiments, a clearcoat layer may be deposited over at least a portion of the color-imparting non-hiding coating layer.

As used herein, the term "reflective surface" refers to a surface comprising a reflective material having a total reflectance of at least 30%, such as at least 40%. "Total reflectance" refers herein to the ratio of reflected light from an object relative to the incident light that impinges on the object in the visible spectrum integrating over all viewing angles. "Visible spectrum" refers herein to that portion of the electromagnetic spectrum between wavelengths 400 and 700 nanometers. "Viewing angle" refers herein to the angle between the viewing ray and a normal to the surface at the point of incidence.

The reflectance values described herein may be determined, for example, by using a Minolta Spectrophotometer CM-3600d according to the manufacturer supplied instructions.

In certain embodiments, the reflective surface comprises a substrate material such as, for example, polished aluminum, cold roll steel, chrome-plated metal, or vacuum deposited metal on plastic, among others. In other embodiments, the reflective surface may comprise a previously coated surface which may, for example, comprise a reflective coating layer deposited from a coating composition, such as, for example, a silver metallic basecoat layer, a colored metallic basecoat layer, a mica containing basecoat layer, or a white basecoat layer, among others.

Such reflective coating layers may be deposited from a film-forming composition that may, for example, include any of the film-forming resins typically used in protective coating compositions. For example, the film-forming composition of the reflective coating may comprise a resinous binder and one or more pigments to act as the colorant. Useful resinous binders include, but are not limited to, acrylic polymers, polyesters, including alkyds and polyurethanes. The resinous binders for the reflective coating composition may, for example, be embodied in a powder coating composition, an organic solvent-based coating composition or a water-based coating composition.

As noted, the reflective coating composition can contain pigments as colorants. Suitable pigments for the reflective coating composition include, for example, metallic pigments, which include aluminum flake, copper or bronze flake and metal oxide coated mica; non-metallic color pigments, such as titanium dioxide, iron oxide, chromium oxide, lead chromate, and carbon black; as well as organic pigments, such as, for example, phthalocyanine blue and phthalocyanine green.

The reflective coating composition can be applied to a substrate by any conventional coating technique such as brushing, spraying, dipping or flowing, among others. The usual spray techniques and equipment for air spraying, airless spraying and electrostatic spraying in either manual or automatic methods can be used. During application of the basecoat to the substrate, the film thickness of the basecoat formed on the substrate often ranges from 0.1 to 5 mils (2.5 to 127 micrometers), or 0.1 to 2 mils (2.5 to 50.8 micrometers).

After forming a film of the reflective coating on the substrate, the reflective coating can be cured or alternatively given a drying step in which solvent is driven out of the basecoat film by heating or an air drying period before application of subsequent coating compositions. Suitable drying conditions will depend on the particular basecoat composition, and one the ambient humidity if the composition is water-borne, but often, a drying time of from 1 to 15 minutes at a temperature of 75° to 200° F. (21° to 93° C.) will be adequate.

The reflective surfaces of the present invention are at least partially coated with a color-imparting non-hiding coating layer deposited from a powder coating composition of the present invention. As used herein, the term "non-hiding coating layer" refers to a coating layer wherein, when deposited onto a surface, the surface beneath the coating layer is visible. In certain embodiments of the present invention, the surface beneath the non-hiding coating layer is visible when the non-hiding layer is applied at a dry film thickness of 0.5 to 5.0 mils (12.7 to 127 microns). One way to assess non-hiding is by measurement of opacity. As used herein, "opacity" refers to the degree to which a material obscures a substrate.

"Percent opacity" refers herein to the ratio of the reflectance of a dry coating film over a black substrate of 5% or less reflectance, to the reflectance of the same coating film, equivalently applied and dried, over a substrate of 85% reflectance. The percent opacity of a dry coating film will depend on the dry film thickness of the coating and the concentration of color-imparting particles. In certain embodiments of the present invention, the color-imparting non-hiding coating layer has a percent opacity of no more than 90 percent, such as no more than 50 percent, at a dry film thickness of one (1) mil (about 25 microns).

In certain embodiments of the reflective surfaces of the present invention, a clearcoat layer is deposited over at least a portion of the color-imparting non-hiding coating layer. The clearcoat layer may be deposited from a composition that comprises any typically film-forming resin and can be applied over the color-imparting non-hiding layer to impart additional depth and/or protective properties to the surface underneath. The resinous binders for the clearcoat can be embodied as a powder coating composition, an organic solvent-based coating composition, or a water-based coating composition. Optional ingredients suitable for inclusion in the clearcoat composition include those which are well known in the art of formulating surface coatings, such as those materials described earlier. The clearcoat composition can be applied to a substrate by any conventional coating technique such as brushing, spraying, dipping or flowing, among others.

In certain embodiments, coatings deposited from a powder coating composition of the present invention exhibit a "richer" color as compared to a similar powder coating composition that does not include a plurality of polymer-enclosed nanoparticles having a maximum haze of 10%, such as those described above. As a result, the present invention is directed to methods for increasing the color richness of a coating deposited from a powder coating composition. These methods comprise including in the powder coating composition a plurality of polymer-enclosed nanoparticles having a maximum haze of 10%. As used herein, the term "color richness" refers to the L* value in the CIELAB color system as described in U.S. Pat. No. 5,792,559 at col. 1, lines 34 to 64, the cited portion of which being incorporated herein by reference, wherein a lower L* value corresponds to a higher level of color richness. For purposes of the present invention, color measurements at various angles can be made using an X-RITE spectrophotometer, such as an MA68I Multi-angle spectrophotometer, commercially available from X-Rite Instruments, Inc.

The present invention is also directed to methods for matching the color of a preselected protective and decorative coating deposited from a liquid coating composition. The inventors have discovered that, unlike prior art powder coating compositions, the powder coating compositions of the present invention are capable of producing coatings that exhibit color properties similar to coatings deposited from liquid coating compositions. As a result, the powder coating compositions of the present invention can be used for color matching of coatings deposited from liquid coating compositions. These methods comprise: (a) determining the visible color of the preselected coating by measuring the absorbance or reflectance of the preselected coating; and (b) making a powder coating composition comprising a plurality of polymer-enclosed nanoparticles having a maximum haze of 10%, wherein a coating deposited from the powder coating composition matches the visible color of the preselected coating. In these methods, the absorbance or reflectance of the preselected coating is determined using a spectrophotometer (as described above) and a curve of the absorbance or reflectance across the range of wavelengths corresponding to the visible spectrum is produced. This curve is referred to as the visible absorbance or reflectance spectrum. A powder coating composition is produced, which includes a plurality of polymer-enclosed nanoparticles having a maximum haze of 10%, such that the coating deposited from the powder coating composition has a visible absorbance or reflectance spectrum closely matching that of the preselected coating.

The present invention is also directed to surfaces, such as a reflective surface, at least partially coated with a transparent tinted coating exhibiting a plurality of hues, wherein the transparent tinted coating is deposited from a coating composition, such as a powder coating composition, comprising polymer-enclosed color-imparting particles of the type described herein, wherein the coating has a plurality of thicknesses. As used herein, the term "hue" refers to the quality of a color as determined by its dominant wavelength. As used herein, the term "plurality" means two or more. As used herein, the term "transparent", refers to a coating wherein a surface beyond the coating is visible to the naked eye when viewed through the coating. Depending upon the desired application, such a transparent coating can have relatively low transmission, i.e., a spectral transmission of no more than 50% or, in some cases, no more than 10%, or, in yet other cases, no more than 5%, while, in other cases, the transparent article can have a relatively high transmission, i.e., a spectral transmission of more than 50%, in some cases at least 60%, or, in yet other cases, at least 80%. The foregoing spectral transmission values being measured at a wavelength ranging from 410 nanometers to 700 nanometers, based upon ASTM Standard No. D-1003 using a Hunter Lab COLORQUEST® II Sphere spectrophotometer that is available from Hunter Associates Laboratory, Inc. of Reston, Va.

As indicated, in these embodiments of the present invention, the transparent coating has a plurality of thicknesses. This can be achieved by any of a variety of methods. For example, in certain embodiments, this is achieved by applying the coating to a transparent article comprising a surface that has been roughened or textured, so that the thickness of the coating varies along the roughened or textured surface. Alternatively, this can be achieved during the coating deposition step, by differentially depositing the coating over selected portions of the surface of the article. This can also be achieved by depositing the coating onto the article and then removing a portion of the coating at certain locations, such as in any desired pattern form. As a result, articles with a patterned appearance may be produced, if desired. In certain embodiments, a clear topcoating is deposited over at least a portion of the transparent tinted coating.

In addition, the present invention is also directed to surfaces, such as a reflective surface, at least partially coated with a multi-layer composite coating comprising a first transparent tinted coating exhibiting a first color and a second transparent tinted coating deposited over at least a portion of the first transparent tinted coating and exhibiting a second color different from the first color. In these multi-layer composite coatings, the transparent tinted coatings are deposited from a coating composition, such as a powder coating composition, comprising polymer-enclosed color-imparting particles of the type described herein, wherein at least one of the transparent tinted coatings, in some cases at least two of the transparent tinted coatings, have a plurality of thicknesses. In certain embodiments, such multi-layer composite coatings further comprise a clear topcoating deposited over at least a portion of the first transparent tinted coating and/or the second transparent tinted coating.

The present invention have discovered that the transparent tinted coatings deposited from a coating composition of the present invention, such as the previously described powder coating compositions, are capable of producing unique, vibrant colored coatings suitable for application in various applications, such as automotive bodies, automotive parts, aerospace, consumer electronics, and other applications, to achieve appearances heretofore unattainable through the use of conventional coating compositions, particularly conventional powder coating compositions.

Illustrating the invention are the following examples that are not to be considered as limiting the invention to their details. All parts and percentages in the examples, as well as throughout the specification, are by weight unless otherwise indicated.

EXAMPLES

Example 1

Polyurethane Dispersion

This example describes the preparation of a polyurethane dispersion that was subsequently used to the form the polyurethane/nanopigment dispersions of Examples 2 to 3. The polyurethane dispersion was prepared from the following mixture of ingredients in the ratios indicated:

| Ingredients | Weight (grams) |
|---|---|
| Charge I | |
| Poly (neopentylglycol adipate)[1] | 780.0 |
| Dimethylolpropionic acid (DMPA) | 280.7 |
| Tri-ethylamine | 127.1 |
| Butylated hydroxytoluene | 2.5 |
| Triphenyl phosphite | 2.5 |
| Charge II | |
| Hydroxyethyl methacrylate (HEMA) | 116.7 |
| Butyl methacrylate | 791.2 |
| Charge III | |
| Methylene bis(4-cyclohexylisocyanate) | 1175.1 |
| Charge IV | |
| Butyl methacrylate | 57.5 |
| Charge V | |
| Deionized water | 4734.8 |
| Ethylenediamine | 49.2 |
| Dimethylethanolamine | 40.6 |
| Charge VI | |
| Butyl methacrylate | 50 |

[1]Poly (neopentylglycol adipate) having a number average molecular weight of 1000.

The polyurethane dispersion was prepared in a four neck round bottom flask equipped with an electronic temperature probe, mechanical stirrer, condenser, and a heating mantle. Charge I was stirred 5 minutes in the flask at a temperature of 90° C. Charge II was added and the mixture was cooled to 60° C. Charge III was added over a 10 minute period. Charge IV was added and the resulting mixture was gradually heated to 90° C. over 45 minutes and then held at 90° C. for 3 hours. Charge V was stirred in a separate flask and heated to 80° C. 3000.0 g of the reaction product of Charges I, II, III, and IV was added to Charge V over 30 minutes. Charge VI was added and the resulting mixture was cooled to room temperature. The final product was a translucent emulsion with an acid value of 12.1, a Brookfield viscosity of 872 centipoise (spindle #3 at 30 rpm), a pH of 7.75, and a nonvolatile content of 29.4% as measured a t 110° C. for one hour.

Example 2

Polyurethane/Nanopigment Dispersion

This example describes the preparation of a nano-sized PB 15:3 phthalocyanine blue pigment dispersion. The dispersion was prepared from the following mixture of ingredients in the ratios indicated:

| Ingredients | Weight (grams) |
|---|---|
| Charge I | |
| Polyurethane dispersion of Example 1 | 4772.7 |
| Deionized water | 2304.5 |
| Hydroquinone methyl ether (MEHQ) | 1.36 |
| PB 15:3 pigment[2] | 700.0 |
| Shellsol OMS (Shell Chemical Co.) | 86.4 |
| Charge II | |
| Deionized water | 71.5 |
| t-Butyl hydroperoxide (70% aqueous solution) | 5.8 |
| Charge III | |
| Deionized water | 337.2 |
| Ferrous ammonium sulfate | 0.13 |
| Sodium metabisulfite | 8.18 |

[2]Commercially available from BASF Corp.

The ingredients were mixed using a 4.5 inch Cowles blade attached to an air motor. The mixture was then pre-dispersed Premier Mill PSM-11 basket mill containing 353 mL of 1.2-1.7 mm Zirconox YTZ® milling media for 1.25 hours at 1000 fpm for the mix blades and 960 rpm pump speed and then recycled through an Advantis V15 Drais mill containing 500 mL of 0.3 mm Zirconox YTZ® grinding media in a one liter grinding chamber. The mixture was milled at 1400 rpm with a pump setting of 19 rpm for a total time of 15 hours. The progress of the milling was monitored by visually observing changes in the transparency of thin films of samples drawn down over black and white Leneta paper. Charge II was added and the resulting mixture was stirred 5 minutes. Charge III was added in two aliquots over 5 minutes. The final product was a cyan (Blue) liquid with a Brookfield viscosity of 356 centipoise (spindle #3 at 30 rpm), a pH of 7.29, and a nonvolatile content of 28.9% as measured at 110° C. for one hour.

Example 3

Polyurethane/Nanopigment Dispersion

This example describes the preparation of a nano-sized PR 122 quinacridone magenta pigment dispersion. The dispersion was prepared from the following mixture of ingredients in the ratios indicated:

| Ingredients | Weight (grams) |
|---|---|
| Charge I | |
| Polyurethane dispersion of Example 1 | 4772.7 |
| Deionized water | 2304.5 |
| Hydroquinone methyl ether (MEHQ) | 1.36 |
| PR 122 pigment[3] | 700.0 |

-continued

| Ingredients | Weight (grams) |
|---|---|
| Shellsol OMS (Shell Chemical Co.) | 86.4 |
| Charge II | |
| Deionized water | 71.5 |
| t-Butyl hydroperoxide (70% aqueous solution) | 5.8 |
| Charge III | |
| Deionized water | 337.2 |
| Ferrous ammonium sulfate | 0.13 |
| Sodium metabisulfite | 8.18 |

[3]Commercially available from Sun Chemical.

The ingredients were mixed using a 4.5 inch Cowles blade attached to an air motor. The mixture was then pre-dispersed Premier Mill PSM-11 basket mill containing 353 mL of 1.2-1.7 mm Zirconox YTZ® milling media for 1.5 hours at 1000 fpm for the mix blades and 960 rpm pump speed and then recycled through an Advantis V15 Drais mill containing 500 mL of 0.3 mm Zirconox YTZ® grinding media in a one liter grinding chamber. The mixture was milled at 1260 rpm with a pump setting of 19 rpm for a total time of 15 hours. The progress of the milling was monitored by visually observing changes in the transparency of thin films of samples drawn down over black and white Leneta paper. Charge II was added and the resulting mixture was stirred 5 minutes. Charge III was added in two aliquots over 5 minutes. The final product was a magenta liquid with a Brookfield viscosity of 28.1 centipoise (spindle #3 at 30 rpm), a pH of 7.61, and a non-volatile content of 28.2% as measured at 110° C. for one hour.

Example 4

Preparation of Powder Coating Composition Intermediate

This example describes the preparation of a core formula of dry materials used to make the powder coating compositions of the subsequent Examples. The core formula was prepared from the following ingredients in the ratios indicated:

| Component | Ingredients | Parts by Weight |
|---|---|---|
| 1 | Uralac P880 Resin[4] | 81.136 |
| 2 | Primid XL552[5] | 11.064 |
| 3 | Resinflow PL 200A[6] | 1 |
| 4 | Benzoin[7] | 0.7 |
| 5 | Irganox 1076[8] | 1.2 |
| 6 | Flow Additive | 1.3 |
| 7 | Tinuvin 144[9] | 1 |
| 8 | Tinuvin 900[9] | 2 |
| 9 | Transparent Zinc Oxide[10] | 0.5 |
| 10 | Aluminum Oxide C[11] | 0.01 |

[4]Commercially available from DSM Resins.
[5]Commercially available from EMS.
[6]Commercially available from Estron Chemical.
[7]Commercially available from GCA Chemical.
[8]Commercially available from Clariant.
[9]Commercially available from CIBA.
[10]Commercially available from Bayer Chemical.
[11]Commercial available from Palmer Supplies.

Components 1 to 9 were premixed in a Henschel Blender for 1 minute at 1000 RPM. The mixture was then extruded through a Coperion W&P 30 mm co-rotating twin screw extruder at a 340 RPM screw speed and an average torque of 30-40%. The extruder was equipped with a low pressure injection system and five independently temperature controlled zones, as described in United States Published Patent ions 2005/0213423; 2005/0212159A1; and 2005/0212171A1. The five independently temperature controlled zones were controlled at the following temperatures: Zone 1: 60° C.; Zone 2: 120° C.; Zone 3: 130° C.; Zone 4: 120° C.; Zone 5: 100° C. The extrudate was cooled and ground in a mechanical milling system to a particle size of about 28 to 30 microns. Oversized particles were removed and component 10 was added.

Example 5

Preparation of Powder Coating Compositions

Two powder coating compositions were prepared. The first powder coating composition was prepared from the composition intermediate of Example 4 and the Polyurethane/Nanopigment Dispersion of Example 2. The second powder coating composition was prepared from the composition intermediate of Example 4 and a mixture of the Polyurethane/Nanopigment Dispersions of Examples 3 and 2 (weight ratio of 95:5). The composition intermediate from Example 4 and the pigment dispersions were mixed by creating powder slurries. The slurries were prepared from the following mixture of ingredients in the ratios indicated:

| Component | Example 5A (grams) | Example 5B (grams) |
|---|---|---|
| Example 4 | 266.3 | 259.6 |
| Deionized Water | 721.7 | 713.6 |
| Example 2 | — | 25.0 |
| Example 3 | 12.1 | 1.9 |

The slurries were prepared in half gallon metal cans equipped with a mechanical stirrer. Each of the powder compositions were prepared by dispersing the composition intermediate of Example 4 in water for five minutes to create a slurry; the pigment dispersions were then added to the slurry and mixed for twenty minutes. The slurries were then poured into flat baking pans; the slurry depth was between ¼ inch and ½ inch. The baking pans containing the slurries were then placed in a ventilated hood and allowed to dry for 16 hours.

The dried powders were then removed from the baking pans and extruded using an APV MP19PC co-rotating twin screw extruder at a 450 RPM screw speed and average torque of 50-60%. The four independently controlled zones were controlled at the following temperatures: Zone 1: 60° C.; Zone 2: 120° C.; Zone 3: 130° C.; Zone 4: 100° C. The extrudate was cooled and 0.01% of Aluminum Oxide C was added. The resulting powder was then ground in a mechanical milling system to a particle size of about 25-30 microns.

Example 6

Preparation of Wheel

The powder coatings from Example 5 were applied to a Toyota Tacoma aluminum wheel (18 inches). The aluminum wheel was purchased commercially and was already coated with a standard wheel coating. The coating was removed and the bare aluminum was cleaned and polished. The sides of the wheel were covered with aluminum foil to protect against overspray during powder application.

The stripped wheel was preheated to 340° F. for fifteen minutes. After heating, the wheel was mounted vertically on a spray rack in a ventilated spray booth. The powder coating from Example 5B was electrostatically sprayed along the outer edge of the wheel face so that a gradient was created where a heavy coating (approximately 2-3 mils) was applied at the edge of the wheel and no coating was applied at the center of the wheel. The coated wheel was then baked at 340° F. for twenty minutes. After the bake was completed, the wheel was allowed to cool at room temperature for ten minutes. The wheel was then vertically mounted on a spray rack in a ventilated spray booth and approximately 2 mils of the powder coating from Example 5A was then electrostatically sprayed over the entire wheel. The coated wheel was then baked at 340° F. for thirty minutes.

After the bake was completed, the wheel was allowed to cool at room temperature for 15 minutes. The wheel was then vertically mounted on a spray rack in a ventilated hood and approximately 2 mils of powder clearcoat PCC10103H (commercially available from PPG Industries) was then electrostatically sprayed over the entire wheel face. The coated wheel was then baked at 340° F. for thirty minutes.

The coating on the wheel exhibited a color gradient ranging from violet around the rim to light blue in the center.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A reflective surface at least partially coated with a transparent tinted coating exhibiting a plurality of hues, wherein the transparent tinted coating is deposited from a coating composition comprising polymer-enclosed color-imparting particles, wherein the coating has a plurality of thicknesses.

2. The reflective surface of claim 1, wherein the reflective surface is a reflective substrate.

3. The reflective surface of claim 1, wherein the transparent tinted coating is deposited from a powder coating composition.

4. The reflective surface of claim 3, wherein the powder coating composition is formed from an aqueous dispersion comprising polymer-enclosed color-imparting particles, wherein the polymer-enclosed color-imparting particles comprise particles enclosed by a friable polymer.

5. The reflective surface of claim 4, wherein the color-imparting particles comprise nanoparticles.

6. The reflective surface of claim 5, wherein the color-imparting particles comprise an organic pigment selected from perylenes, quinacridones, phthalocyanines, isoindolines, dioxazines, 1,4-diketopyrrolopyrroles, anthrapyrimidines, anthanthrones, flavanthrones, indanthrones, perinones, pyranthrones, thioindigos, 4,4'-diamino-1,1'-dianthraquinonyl, azo compounds, substituted derivatives thereof, and mixtures thereof.

7. The reflective surface of claim 4, wherein the friable polymer comprises the reaction product of (i) a polymerizable polyester polyurethane, and (ii) an ethylenically unsaturated monomer.

8. The reflective surface of claim 7, wherein the polymerizable polyester polyurethane is water-dispersible.

9. The reflective surface of claim 7, wherein the polymerizable polyester polyurethane has a weight average molecular weight of 40,000 to 80,000 grams per mole.

10. The reflective surface of claim 4, wherein the aqueous dispersion is prepared by a method comprising:

(A) providing a mixture, in an aqueous medium, of (i) color-imparting nanoparticles, (ii) one or more polymerizable, ethylenically unsaturated monomers; and/or (iii) a mixture of one or more polymerizable unsaturated monomers with one or more polymers; and/or (iv) one or more polymers, and then subjecting the admixture to high stress shear conditions in the presence of an aqueous medium to particularize the admixture into polymer-enclosed color-imparting particles; or (B) providing a mixture, in an aqueous medium, of (i) color-imparting particles, (ii) a polymerizable ethylenically unsaturated monomer, and (iii) a water-dispersible polymerizable dispersant; forming the color-imparting particles into nanoparticles; and polymerizing the ethylenically unsaturated monomer and polymerizable dispersant to form polymer-enclosed color-imparting particles comprising a water-dispersible polymer.

11. A reflective surface at least partially coated with a multi-layer composite coating comprising:

(a) a first transparent tinted coating exhibiting a first color; and (b) a second transparent tinted coating deposited over at least a portion of the first transparent tinted coating and exhibiting a second color different from the first color, wherein the first transparent tinted coating and the second transparent tinted coating are deposited from a coating composition comprising polymer-enclosed color-imparting particles, and wherein at least one of the transparent tinted coatings have a plurality of thicknesses.

12. The reflective surface of claim 11, wherein the reflective surface is a reflective substrate.

13. The reflective surface of claim 11, wherein at least one of the first transparent tinted coating and the second transparent tinted coating is deposited from a powder coating composition.

14. The reflective surface of claim 13, wherein the powder coating composition is formed from an aqueous dispersion comprising polymer-enclosed color-imparting particles, wherein the polymer-enclosed color-imparting particles comprise particles enclosed by a friable polymer.

15. The reflective surface of claim 14, wherein the color-imparting particles comprise nanoparticles.

16. The reflective surface of claim 15, wherein the color-imparting particles comprise an organic pigment selected from perylenes, quinacridones, phthalocyanines, isoindolines, dioxazines, 1,4-diketopyrrolopyrroles, anthrapyrimidines, anthanthrones, flavanthrones, indanthrones, perinones, pyranthrones, thioindigos, 4,4'-diamino-1,1'-dianthraquinonyl, azo compounds, substituted derivatives thereof, and mixtures thereof.

17. The reflective surface of claim 14, wherein the friable polymer comprises the reaction product of (i) a polymerizable polyester polyurethane, and (ii) an ethylenically unsaturated monomer.

18. The reflective surface of claim 17, wherein the polymerizable polyester polyurethane is water-dispersible.

19. The reflective surface of claim 14, wherein the aqueous dispersion is prepared by a method comprising:

(A) providing a mixture, in an aqueous medium, of (i) color-imparting nanoparticles, (ii) one or more polymerizable, ethylenically unsaturated monomers; and/or (iii) a mixture of one or more polymerizable unsaturated monomers with one or more polymers; and/or (iv) one or more polymers, and then subjecting the admixture to high stress shear conditions in the presence of an aqueous medium to particularize the admixture into polymer-enclosed color-imparting particles; or (B) providing a mixture, in an aqueous medium, of (i) color-imparting particles, (ii) a polymerizable ethylenically unsaturated monomer, and (iii) a water-dispersible polymerizable dispersant; forming the color-imparting particles into nanoparticles; and polymerizing the ethylenically unsaturated monomer and polymerizable dispersant to form polymer-enclosed color-imparting particles comprising a water-dispersible polymer.

20. A method for making a powder coating composition comprising:

(a) introducing an aqueous dispersion of polymer-enclosed particles to a mixture comprising dry materials and water,
(b) removing the water from the product of step (a) to form a solid material; and
(c) fragmenting the solid material.

* * * * *